(12) United States Patent
Kleinhans

(10) Patent No.: US 11,247,876 B2
(45) Date of Patent: Feb. 15, 2022

(54) MOBILE CRANE, MOBILE CRANE DOLLY AND MOBILE CRANE SYSTEM

(71) Applicant: TADANO FAUN GMBH, Lauf A. D. Pegnitz (DE)

(72) Inventor: Peter Kleinhans, Baiersdorf (DE)

(73) Assignee: TADANO FAUN GmbH, Lauf a. d. Pegnitz (DE)

( * ) Notice: Subject to any disclaimer, the term of this patent is extended or adjusted under 35 U.S.C. 154(b) by 108 days.

(21) Appl. No.: 16/750,080

(22) Filed: Jan. 23, 2020

(65) Prior Publication Data
US 2020/0239286 A1 Jul. 30, 2020

(30) Foreign Application Priority Data

Jan. 28, 2019 (DE) .............................. 102019201049

(51) Int. Cl.
*B66C 9/10* (2006.01)
*B66C 13/18* (2006.01)
(Continued)

(52) U.S. Cl.
CPC ............... *B66C 23/42* (2013.01); *B60P 3/40* (2013.01); *B66C 9/10* (2013.01); *B66C 13/18* (2013.01);
(Continued)

(58) Field of Classification Search
CPC ... B60P 3/40; B66C 9/10; B66C 13/18; B66C 23/36; B66C 23/62; B66C 23/86; B66C 23/88; B66C 2700/0371; B66C 2700/0378
See application file for complete search history.

(56) References Cited

U.S. PATENT DOCUMENTS 2,631,737 A 3/1953 Cullen
3,747,957 A * 7/1973 Noll .................. B66C 23/36
280/404
(Continued)

FOREIGN PATENT DOCUMENTS

CN 204324769 U 5/2015
DE 2416403 C3 11/1974
(Continued)

OTHER PUBLICATIONS

DE 202010002947 Machine Translation (Year: 2011).*
DE 2416403 Machine Translation (Year: 1984).*

*Primary Examiner* — Michael R Mansen
*Assistant Examiner* — Juan J Campos, Jr.
(74) *Attorney, Agent, or Firm* — Laurence A. Greenberg; Werner H. Stemer; Ralph E. Locher

(57) ABSTRACT

A mobile crane has an undercarriage, a superstructure arranged on the undercarriage, a slewing gear by which the superstructure may be rotated relative to the undercarriage, a slewing gear brake that acts on the slewing gear to brake a rotation of the superstructure, and a jib mounted on the superstructure as to be adjustable in luffing angle and/or in length. The mobile crane additionally contains a dolly coupling arranged on the jib and by which the jib is coupled to a mobile crane dolly during dolly travel with the superstructure in an extended position. The mobile crane further has a sensor interface for connecting a dolly coupling sensor, and a controller that is adapted to ascertain during dolly travel, in dependence on a signal received from the dolly coupling sensor, whether the jib rests on the mobile crane doll, and to activate the slewing gear brake if it does not.

11 Claims, 3 Drawing Sheets

(51) Int. Cl.
    *B66C 23/62*     (2006.01)
    *B66C 23/86*     (2006.01)
    *B66C 23/42*     (2006.01)
    *B66C 23/00*     (2006.01)
    *B60P 3/40*     (2006.01)
    B66C 23/70     (2006.01)

(52) U.S. Cl.
    CPC .............. *B66C 23/54* (2013.01); *B66C 23/62* (2013.01); *B66C 23/86* (2013.01); *B66C 23/701* (2013.01); *B66C 2700/0371* (2013.01); *B66C 2700/0378* (2013.01)

(56) References Cited

U.S. PATENT DOCUMENTS

| | | | | |
|---|---|---|---|---|
| 3,883,158 A | * | 5/1975 | Fikse | B60P 3/40 |
| | | | | 280/404 |
| 3,926,453 A | * | 12/1975 | Leslie | B66C 23/42 |
| | | | | 280/81.1 |
| 4,154,316 A | * | 5/1979 | Kokkila | B66C 23/62 |
| | | | | 180/14.1 |
| 4,166,544 A | * | 9/1979 | Cecchi | F16L 1/032 |
| | | | | 212/239 |
| 4,716,728 A | | 1/1988 | Kakeya | |
| 6,631,817 B1 | * | 10/2003 | Fleagle | A61P 9/00 |
| | | | | 212/301 |
| 9,126,626 B1 | * | 9/2015 | Dieleman | B60P 3/40 |
| 2004/0221673 A1 | | 11/2004 | Mojzis | |
| 2006/0140783 A1 | | 6/2006 | Wolfram et al. | |
| 2015/0073667 A1 | | 3/2015 | Plagemann et al. | |

FOREIGN PATENT DOCUMENTS

DE      202010002947 U1      9/2011
GB      1422917 A      1/1976

* cited by examiner

II-II

II-II

II-II

MOBILE CRANE, MOBILE CRANE DOLLY AND MOBILE CRANE SYSTEM

CROSS-REFERENCE TO RELATED APPLICATION

This application claims the priority, under 35 U.S.C. § 119, of German application DE 10 2019 201 049, filed Jan. 28, 2019; the prior application is herewith incorporated by reference in its entirety.

BACKGROUND OF THE INVENTION

Field of the Invention

The invention relates to a mobile crane. In addition, the invention relates to a mobile crane dolly that is intended in particular for use with the mobile crane. The invention also relates to a mobile crane system.

A mobile crane usually has an undercarriage containing a chassis, a drive motor and a driver's position (a cab, cockpit or the like). Ordinarily, a superstructure that may be swiveled about a swivel axis or rotary axis is arranged on this undercarriage. The superstructure carries a jib, which is usually configured to be telescopic and is able to be "luffed" (i.e. swiveled or tilted) in the height direction. The mobile crane is also self-propelled and is usually transported to its place of use by driving on the road. Generally, the superstructure is swiveled to a zero degree position (forward and parallel to the longitudinal axis) and the jib is telescoped and swiveled approximately to the horizontal during road travel (and also when the mobile crane is not in use). Usually the jib rests on a kind of bracket that may optionally be mounted on the roof of the cockpit. For road travel, the mobile crane must also comply with the national regulations governing the use of public roads.

In some countries, however, mobile cranes that are particularly large and thus also heavy exceed the permissible axle load on roads. In this case, mobile crane dollies are frequently used. This is a kind of trailer with a bearing block for the jib. The superstructure is first swiveled into a 180-degree position and the jib is set down on the bearing block of the mobile crane dolly. As a result, the axle load on the driving axles of the undercarriage is reduced. However, dolly travel also comes with dangers. To enable cornering, a slewing gear brake of the superstructure, which may be used to prevent rotation of the superstructure, is inactive in dolly operation—and also in conventional travel operation during street travel. As a result, the superstructure may rotate freely and the mobile crane dolly is also able to follow the mobile crane around curves.

If the road is uneven, however, the mobile crane dolly may be lifted off the road on the jib. In this state, the superstructure may rotate freely with the mobile crane dolly suspended from the jib, which is extremely dangerous.

SUMMARY OF THE INVENTION

The object of the invention is to increase the safety of a mobile crane, in particular during street travel.

This object is accomplished according to the invention by a mobile crane with the features of the independent mobile crane claim. Additionally, this object is accomplished according to the invention by a mobile crane dolly with the features of the independent mobile crane dolly claim. In addition, this object is accomplished according to the invention by a mobile crane system with the features of independent mobile crane system claim. Embodiments and refinements of the invention that are advantageous, and in part inventive in their own right, are described in the dependent claims and in the following description.

The mobile crane according to the invention contains an undercarriage and a superstructure arranged on the undercarriage. The mobile crane also contains a slewing gear by means of which the superstructure may be rotated relative to the undercarriage. In other words, during proper crane operation, the superstructure is rotated by the slewing gear. Moreover, the mobile crane contains a slewing gear brake, which acts on the slewing gear to brake a rotation of the superstructure. Additionally, the mobile crane contains a jib that is mounted on the superstructure so that it may be adjusted in terms of luffing angle and/or length (preferably telescopic). For dolly travel, the mobile crane also contains a dolly coupling arranged on the jib, by which the jib is coupled to a mobile crane dolly during the dolly travel, with the superstructure in an extended position. In this case, the jib preferably rests on the mobile crane dolly. The mobile crane also contains a sensor interface for connecting a dolly coupling sensor and a control unit, which preferably is linked to the sensor interface by signal transmission and is adapted to ascertain, during dolly travel, whether the jib is resting on the mobile crane dolly, as a function of a signal relating to the dolly coupling sensor, and to activate the slewing gear brake if it does not. This means that the control unit is adapted to activate the slewing gear brake if the jib is not resting on the mobile crane dolly. Preferably, therefore, the slewing gear brake is (also) integrated into the mobile crane during road travel and not only during crane operation.

Preferably, the slewing gear brake is a type of multi-plate clutch that is closed for braking. Alternatively, the slewing gear brake may also be a type of disc brake, drum brake or, for example, a braking device that is pressed onto a slewing ring (for example a bearing ring) of the slewing gear to apply braking.

According to the invention, the dolly coupling sensor, which is coupled to the sensor interface at least during proper dolly travel, is used to monitor whether the jib is resting properly on the mobile crane dolly (hereinafter simply called the "dolly"), preferably on a kind of bearing block of the dolly. Advantageously, as a result of activating the slewing gear brake if the jib no longer rests on the dolly, the superstructure is no longer able to rotate freely relative to the undercarriage. This leads to an increase in (traffic) safety, because otherwise—for example when driving over a bump while navigating a curve—the dolly could lose contact with the ground and hang freely from the jib, and as a result the jib could stand at a right angle to the undercarriage. This situation poses enormous risks, because under certain circumstances, the jib could swing into oncoming traffic on a multi-lane road or could endanger buildings, pedestrians or the like. By activating the slewing gear brake, such an extension (swinging outward) of the jib is effectively prevented, thus significantly reducing the risk potential.

Preferably, the control unit is adapted to ascertain, by means of the signal from the dolly coupling sensor, whether the dolly is hanging freely from the jib, or the jib has detached from the dolly. In the latter case in particular, the control unit is adapted to issue a warning message in addition to activating the slewing gear brake, and optionally to initiate emergency braking, or to suggest emergency braking to the mobile crane driver, because a "lost" dolly represents a high danger for other road users. Preferably, in this case, the control unit is adapted to initiate or suggest emergency braking only after, or together with, activating the slewing gear brake, because during braking with a freely rotatable superstructure (i.e. inactive slewing gear brake and no contact with the dolly or with the ground via the dolly) the superstructure may in particular be caused to rotate due to inertia.

In an expedient embodiment, the control unit is adapted to activate the slewing gear brake to apply braking to varying degrees, as a function of a travel speed and/or cornering speed of the mobile crane. For example, when driving slowly straight ahead, the slewing gear brake is only actuated for minor braking, because a rotation of the superstructure due to centrifugal force is comparatively unlikely in this case. At a high cornering speed—i.e. in particular when navigating a narrow curve (even at a slow driving speed) or a (comparatively) broad curve at a high travel speed—the slewing gear brake is used to apply comparatively strong braking, and the slewing gear brake is optionally controlled so as to block the rotation of the superstructure, because a strong (and in particular also fast) rotation of the superstructure is to be expected here.

In an expedient embodiment, the mobile crane has only one drive motor, which is arranged on the undercarriage and serves to generate energy both for travel operation (for example road travel) and for crane operation (in which the mobile crane, specifically the undercarriage, is usually supported on extendable supports and is therefore stationary). The slewing gear brake is configured as a hydraulic brake (preferably irrespective of the number of drive motors). Preferably, the slewing gear brake is arranged on the superstructure. In this case, the control unit is in particular adapted to release a hydraulic line leading to the slewing gear brake (preferably from the undercarriage into the superstructure) in order to activate the slewing gear brake by actuating at least one hydraulic valve. Conventionally, the (preferably likewise hydraulically-operated) slewing gear and the slewing gear brake (and usually also a luffing and telescoping cylinder) are depressurized during travel operation. Because the superstructure is ordinarily mechanically fixed to the undercarriage during travel operation using the jib, operating energy may be saved in this way. By diverting operating energy, specifically hydraulic pressure, as described above, to the slewing gear brake during travel operation, the slewing gear brake may thus be used advantageously with otherwise low energy requirements, in particular for activation of the slewing gear brake.

In an alternative embodiment, the mobile crane has a drive motor exclusively for travel operation and a crane operating motor exclusively for crane operation. The slewing gear brake is furnished with operating energy during crane operation by means of the crane operating motor. In this case, the mobile crane is equipped with a separate energy store (expediently a pressure accumulator) for the slewing gear brake, which draws operating energy when the crane operating motor is switched off, i.e. preferably during travel operation and particularly preferably during dolly travel. This makes it possible to operate the slewing gear brake on a mobile crane with two motors (a "twin engine concept") during travel operation, specifically during dolly travel.

In an optional refinement, a "level sensor" is associated with the energy store described above, and is preferably a pressure sensor if the energy store is a pressure accumulator; by means of which the control unit monitors whether sufficient energy, in particular pressure, is available for (further) activating the slewing gear brake during dolly travel. If sufficient energy is not available, the control unit is preferably adapted to issue a corresponding warning message and/or to ask the crane operator to fill the energy store, preferably during a stop.

In another alternative embodiment, the mobile crane constructed according to the twin-engine concept has (as an alternative to the energy store) a hydraulic line fed from the undercarriage motor to the slewing gear brake (arranged on the superstructure). Alternatively, the mobile crane has an additional hydraulic pump operated by the undercarriage motor for a separate supply of energy to the slewing gear brake.

In an expedient embodiment, the control unit is adapted to issue a warning signal to the crane operator when the slewing gear brake is activated (and thus when the jib is not resting on the dolly). In this case, the crane may, for example, initiate a braking maneuver if the mobile crane is in a fast cornering situation or a comparably critical situation.

In another expedient embodiment, the mobile crane has a sensor for detecting a block position of the jib. The term "block position" is used here and in the following to refer in particular to a position of the jib in which it is "swung in" against a mechanical stop, i.e. cannot be tilted any further towards the ground. In this case it is specifically a lower block position. For example, the luffing cylinder of the jib is fully retracted and/or the jib rests on a kind of bearing block or "mount" of the superstructure. In this case, the control unit is preferably adapted to additionally take into account whether the jib is in block position before controlling the slewing gear brake. Expediently, the control unit may be adapted to recognize the block position of the jib as a kind of indication that the jib may lift off the dolly, because in the block position, the jib cannot follow the dolly any further downward. This may cause the dolly to hang from the jib and lift off the ground. Optionally, the control unit is adapted to merge the information from this sensor and the dolly coupling sensor to ascertain whether the jib has detached from the dolly. This may be inferred, for example, from the fact that the "block position sensor" indicates that the jib is arranged in the (lower) block position, and the dolly coupling sensor indicates that the jib is no longer resting on the dolly, and preferably that there is no longer contact between the jib and the dolly.

In a preferred embodiment, the dolly coupling sensor is arranged on the jib in the region of the dolly coupling and is connected to the control unit via the sensor interface. The dolly coupling sensor is thus a component of the mobile crane. This is advantageous in that manufacturer-independent dollies, sometimes constructed by the operating company itself, are also frequently used. Thus safety is also increased in the case of such a "foreign dolly." In addition, there may be a lack of signal transmission from the dolly to the mobile crane.

Alternatively, the sensor interface is adapted and intended to be connected (wired or wirelessly) to a dolly coupling sensor that is arranged on the dolly.

In an expedient embodiment, the dolly coupling sensor is configured as a contact switch or proximity switch (in particular a proximity sensor). If it is a contact switch, it is preferably a mechanical switch. This switch is optionally arranged in such a way that it interacts with a jib coupling of the dolly (which is the counterpart to the dolly coupling) in such a way that the switch is actuated if the dolly is hanging from the jib. Alternatively, the switch is arranged in such a way that if this is the case, the contact is lost and thus the (sensor) signal ceases. In both variants the dolly coupling is configured in such a way that there is a slight play between a position of the jib that is set on the dolly and a position in which the dolly is hanging from the jib. In this case, this play is used as the "play of the switch" for the contact switch. The proximity switch is preferably a non-contact switch, for example a capacitive sensor, inductive sensor, or sensor that measures using ultrasound or light. Its manner of functioning that corresponds to that of the contact switch. However, the proximity switch may also be used to monitor whether the dolly has separated from the jib. In this case, the proximity switch preferably indicates a value that exceeds a distance associated with the play of the switch. This means, in particular, that information about the distance between the jib and the dolly may be ascertained by means of the proximity switch, and a value that exceeds the offset value associated with the play of the switch indicates that the dolly has separated from the jib.

In an alternative embodiment, the dolly coupling sensor is configured as a force sensor. For example, the force sensor is one or more strain gauges or the like. The control unit in this embodiment is particularly adapted to ascertain, as a function of the signal from the dolly coupling sensor, whether the jib is resting on something, specifically the dolly, or whether the dolly is hanging from the jib. For example, the control unit uses the signal from the force sensor to infer the weight hanging from the jib. If the weight (i.e. the force ascertained using the sensor) exceeds a threshold value, the control unit infers that the dolly is hanging from the jib. The force sensor is also expedient for ascertaining whether the jib has come loose from the dolly; in this case, the force sensor specifically indicates a force value of about zero or a force value associated with this state.

The dolly according to the invention is adapted and intended for use with the above-described mobile crane. For this purpose, the dolly comprises a chassis and a jib bracket on which the jib rests during proper dolly operation. To this end, the jib coupling described above for connecting to the dolly coupling of the jib is arranged on the jib bracket. The dolly also contains the dolly coupling sensor, which is preferably adapted and intended for coupling with the sensor interface of the mobile crane.

In an optional embodiment, the dolly contains an air spring bellows for cushioning and/or damping of shocks that an uneven road may cause. In this case, the dolly coupling sensor is expediently configured as an air pressure sensor and is positioned on the air spring bellows. At low air pressure, the spring bellows is usually elongated. If the air pressure is sufficiently low, it may be assumed that the spring bellows is at least almost fully "extended", which is only the case when the dolly is hanging from the jib. The control unit is thus preferably adapted to conclude that the dolly is hanging from the jib, as a function of the (sensor) signal from the air pressure sensor, particularly if the air pressure falls below a predetermined value.

The mobile crane system according to the invention contains the mobile crane described above and the dolly. Particularly if the dolly coupling sensor is arranged on the jib, the dolly coupling sensor is not present on the dolly as described above. The dolly thus has at least the chassis and jib bracket as well as the jib coupling.

In one variant, however, the dolly of the mobile crane system does have the dolly coupling sensor.

In an optional embodiment, the control unit is adapted to activate the slewing gear brake only if it ascertains, as a function of the signal from the dolly coupling sensor, that the jib is not resting on the dolly. In other words, the control unit is preferably adapted to deactivate the slewing gear brake when the jib returns to its proper position on the dolly, in particular when the dolly rests on the ground and the jib rests on the dolly.

Here and below, the conjunction "and/or" signifies that the features that this conjunction links may both be present, or may be designed as alternatives to each other.

Other features which are considered as characteristic for the invention are set forth in the appended claims.

Although the invention is illustrated and described herein as embodied in mobile crane, mobile crane dolly and mobile crane system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Components and magnitudes that correspond to each other are always assigned the same reference signs in all drawings.

Figure 1:
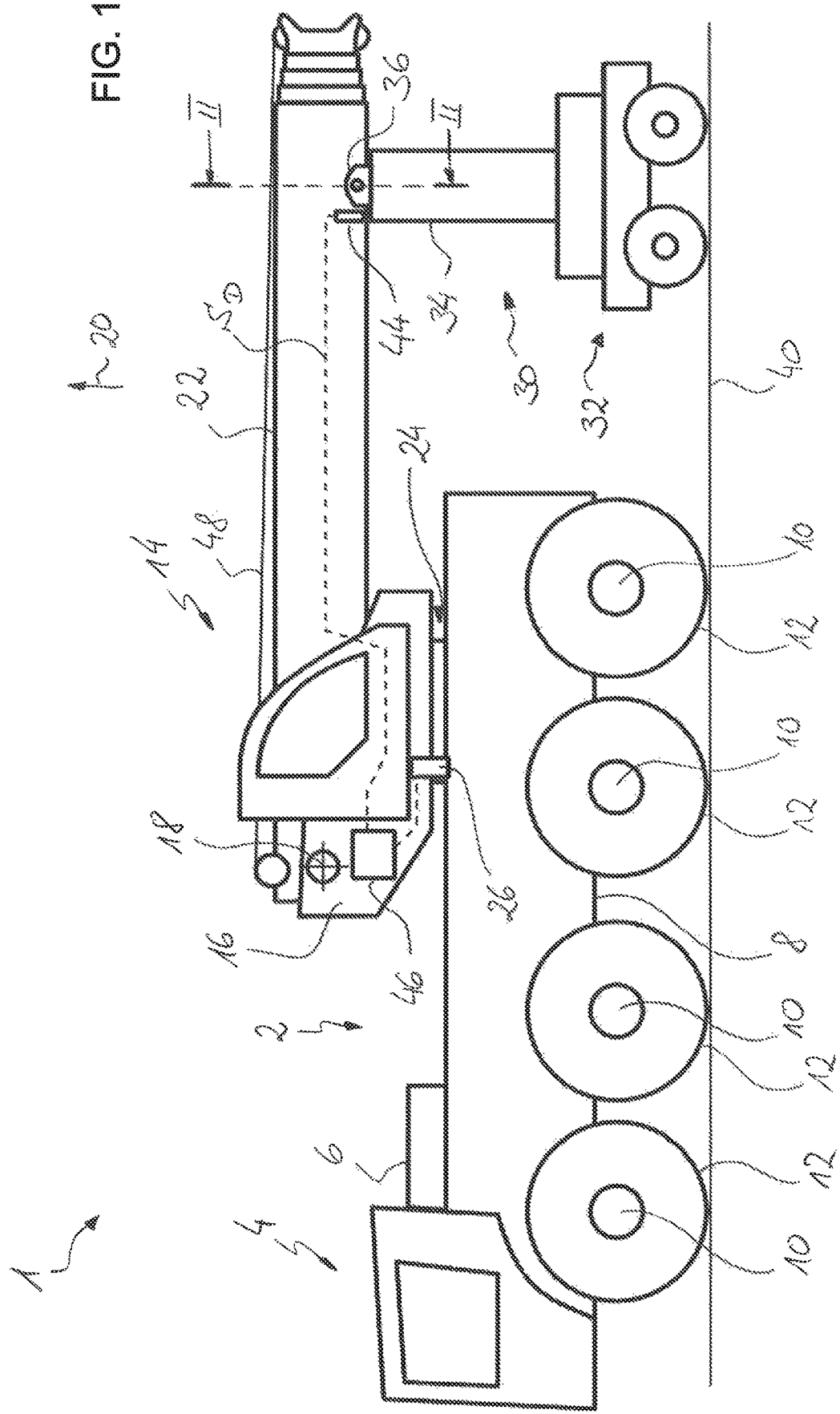
FIG. 1 is a diagrammatic, side view of a mobile crane during dolly travel according to the invention.

Referring now to the figures of the drawings in detail and first, particularly to FIG. 1 thereof, there is shown a schematic view of a mobile crane 1. The mobile crane 1 has an undercarriage 2 with a cockpit 4, a drive motor arranged under a cover 6, a vehicle frame 8 and a plurality of driving axles 10 on which wheels 12 are arranged. In addition, the mobile crane 1 has a superstructure 14 that has a mount 16 for a jib 22 that may be luffed around a "luffing axis" 18, i.e. slewed in the height direction 20. The jib 22 is also configure to be adjustable in length—telescopic. The superstructure 14 may also be rotated or pivoted about an axis of rotation running in the height direction 20 (not shown in greater detail), relative to the undercarriage 2, by a slewing gear 24 (only schematically indicated). The mobile crane 1 also has a slewing gear brake 26, which acts on the slewing gear 24 to brake a rotation of the superstructure 14.

FIG. 1 shows the mobile crane 1 during a what is referred to as dolly travel. For this purpose, the superstructure 14 is pivoted to a 180-degree position, and the jib 22 thus points to the rear. In addition, the jib 22 is mounted on a mobile crane dolly (hereinafter referred to as "dolly 30"). The dolly 30 has a chassis 32 and a jib bracket 34. A jib coupling 36 for mechanically connecting the dolly 30 with the jib 22, specifically a dolly coupling 38 of the jib 22 (see FIG. 4), is arranged in turn on the jib bracket 34. Such dolly travel is usually necessary when the axle load of the mobile crane 1 exceeds a permitted axle load of the road to be driven on. Because the jib 22 rests on the dolly 30 during dolly travel, the weight of the superstructure 14 in particular is distributed over a plurality of axles and thus the axle load of the mobile crane 1 is reduced.

For example, if the mobile crane 1 passes over a bump and/or the dolly 30 traverses a dip, the jib 22 may shift into a lower block position in which the jib 22 cannot move any further toward the ground 40 (see FIG. 1), because it rests against a mechanical stop. If the height difference between the mobile crane 1 and the dolly 30 is greater than the distance that the jib 22 may travel to the lower block position due to the bump or dip, the dolly 30 may lose contact with the ground 40 when suspended from the jib 22. In this case, the superstructure 14 may rotate freely, because the power supply for the slewing gear 24 and slewing gear brake 26 is inactive, enabling free cornering with the dolly 30, which forms a kind of trailer. In addition, the slewing gear 24 and slewing gear brake 26 are always disconnected from the power supply during road travel of the mobile crane 1, because the jib 22 is usually arranged mechanically secured in a storage position.

To prevent the dolly 30 of the superstructure 14 from turning out at right angles to the undercarriage 2 and thus to the direction of travel—for example during a curve—during dolly travel when the dolly is freely suspended from the jib 22, which poses a high risk of accident, the mobile crane 1 has a dolly coupling sensor 44. The sensor is connected to a control unit 46 of mobile crane 1 via an interface that is not shown in greater detail. The control unit 46 is adapted to ascertain whether the jib 22 is resting on the jib bracket 34 of the dolly 30 by means of a (sensor) signal $S_D$ transmitted from the dolly coupling sensor 44. In addition, the control unit 46 is adapted to activate the slewing gear brake 26, specifically for braking the slewing gear 24 and thus at least for slowing down or blocking a superstructure rotation, in the event that the jib 22 is not resting (anymore) on the jib bracket 34.

In the exemplary embodiment shown, for both travel operation and crane operation, the mobile crane 1 has only the drive motor that is mounted on the undercarriage 2. In other words, the drive motor likewise supplies energy, specifically hydraulic pressure, to the slewing gear 24, the slewing gear brake 26, a luffing cylinder not shown in greater detail (for luffing the jib 22) as well as a cable winch for pulling in or paying out the crane cable 48. However, these drive elements are depressurized (i.e. inactive) during travel operation and thus are also inactive during dolly travel. To activate the slewing gear brake 26 during travel operation, the mobile crane 1 has a valve that the control unit 46 (not shown in greater detail) may actuate, by means of which hydraulic pressure may also be applied to the slewing gear brake 26 during travel operation. If the control unit 46 detects by the signal $S_D$ that the dolly 30 is hanging from the jib 22, the control unit 46 opens this valve, so that the slewing gear brake 26 is activated and thus blocks or brakes a rotation of the superstructure 14.

Figure 2:
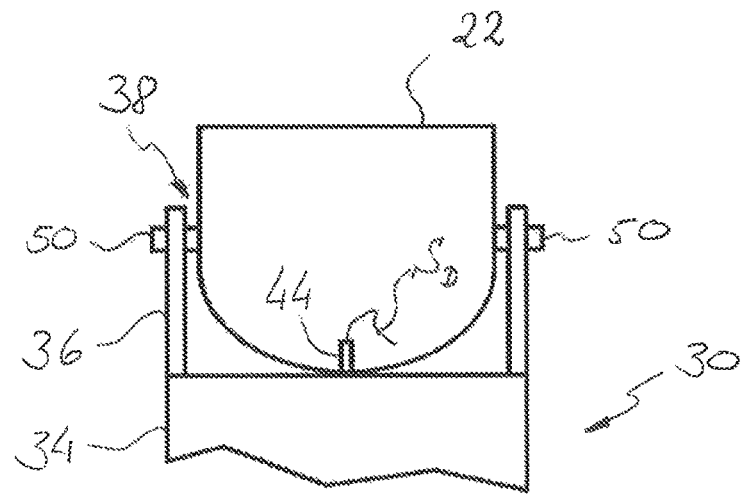
FIG. 2 is a sectional, partial view, taken along the line II-II shown in FIG. 1, of a jib of the mobile crane and the mobile crane dolly in a proper supporting position.
Figure 3:
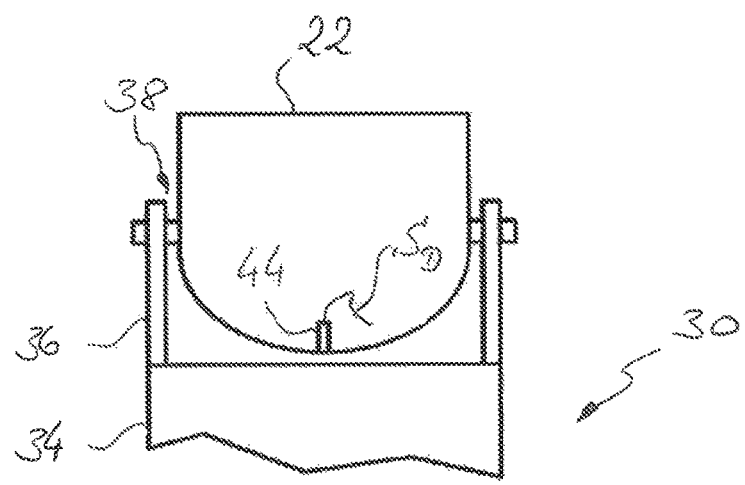
FIG. 3 is a sectional, partial view as in FIG. 2 of the jib in a position that has been lifted from the mobile crane dolly.

In the exemplary embodiment shown in FIGS. 1-3, the dolly coupling sensor 44 is a proximity switch formed by a contactless proximity sensor installed in the jib 22. The dolly coupling sensor 44 and control unit 46 are configured in such a way that when the jib 22 is in the proper position on the dolly 30 (also referred to as the proper contact position), the signal $S_D$ exceeds a predetermined switching value and thus an "active switching state" is indicated.

In order to provide "switching play" for the dolly coupling sensor 44, a range of play is configured between the dolly coupling 38 and the jib coupling 36, specifically between a safety pin 50 and the jib 22, in such a way that in the event that the dolly 30 is hanging from the jib 22, a distance between the dolly 30 and the jib 22 is increased. In this case, the value of the signal $S_D$ changes to in such a way that it specifically falls below the predetermined switching value. The signal $S_D$ thus no longer indicates the active switching state. In this case, the control unit 46 activates the slewing gear brake 26.

Figure 4:
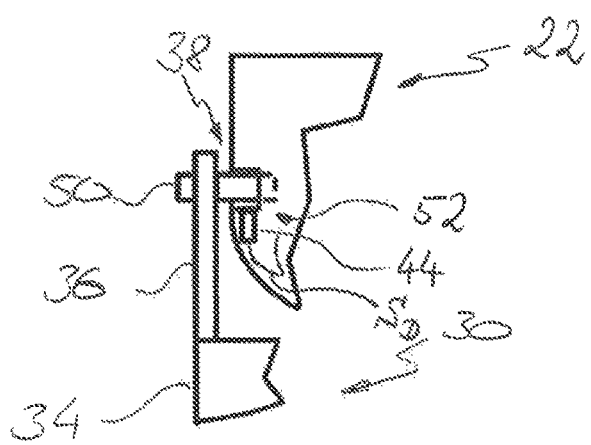
FIGS. 4 and 5 are respective views as in FIG. 2, each showing another exemplary embodiment of the mobile crane.

FIG. 4 shows an alternative exemplary embodiment of the arrangement of the dolly coupling sensor 44 in the form of a proximity switch (alternatively a contact switch). In this case, the dolly coupling sensor 44 is arranged in the area of the dolly coupling 38, and specifically is arranged in such a way that the predetermined switching value is exceeded when the dolly 30 is hanging from the jib 22. For this purpose, the dolly coupling sensor 44 is arranged on the underside of a receptacle 52 in the dolly coupling 38 for the safety bolt 50. If the dolly 30 is hanging from the jib 22, the safety bolt 50 in this receptacle 52 is displaced toward the underside and "triggers" the dolly coupling sensor 44.

Figure 5:
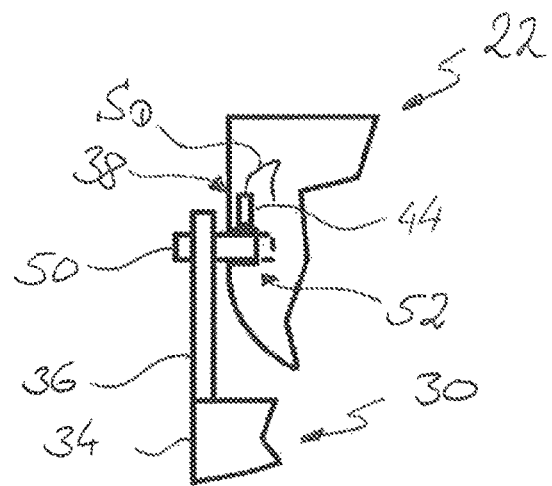

FIG. 5 shows another alternative exemplary embodiment. Here, the dolly coupling sensor 44 is a force sensor. In this case, the receptacle 52 may be designed free of play—at least approximately. In this case, the control unit 46 is adapted to ascertain from the signal $S_D$ the amount of the force with which the jib 22, specifically the dolly coupling 38, is loaded. If this force value exceeds a predetermined threshold value or if this force value corresponds to the weight force of the dolly 30, the control unit 46 activates the slewing gear brake 26 for braking.

Figure 6:
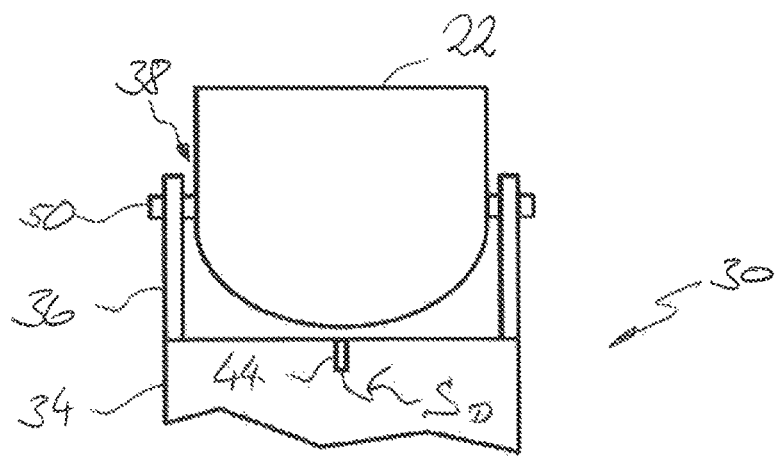
FIGS. 6 and 7 are view as in FIG. 2, respectively, of another exemplary embodiment of the mobile crane and the mobile crane dolly.
Figure 7:
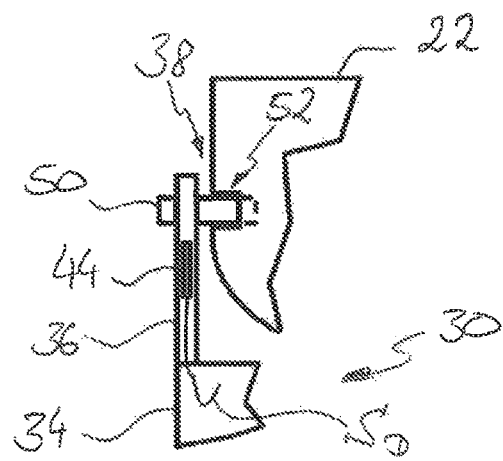

FIGS. 6 and 7 show two more alternative exemplary embodiments. The dolly coupling sensor 44 in this case is not a part of the mobile crane 1 but instead is part of the dolly 30. The dolly coupling sensor 44 is connected to the control unit 46 by means of the signal interface described above, which is not shown in greater detail. By way of example, the signal interface is a plug connection to the wired connection. Alternatively, the signal interface is designed as a wireless interface.

In FIG. 6, the dolly coupling sensor is designed as a proximity switch or contact switch, the function of which corresponds to the exemplary embodiment shown in FIGS. 1-3. FIG. 6 shows the state in which the dolly 30 hangs freely (without ground contact) from the jib 20.

In FIG. 7 the dolly coupling sensor 44 is configured as a force sensor and is adapted to ascertain the amount of force acting on the jib coupling 36. Otherwise, the function corresponds to the exemplary embodiment shown in FIG. 5.

In an exemplary embodiment not shown in greater detail, the mobile crane 1 has an additional sensor that indicates the lower block position of the jib 22. In this case, the control unit 46 is adapted to use the signal $S_D$ from the dolly coupling sensor 44 and the jib 22 block position sensor described above, to ascertain whether the jib 22 is resting on the dolly 30. This may increase reliability.

The subject matter of the invention is not limited to the exemplary embodiments described above. Rather, a skilled person may derive additional embodiments of the invention from the claims and the above description. In particular, the individual features of the invention and its variant configurations that have been described with reference to the various exemplary embodiments may also be combined in other ways.

LIST OF REFERENCE SIGNS

1 Mobile crane
2 Undercarriage
4 Cockpit
6 Cover
8 Vehicle frame
10 Driving axle
12 Wheel
14 Superstructure
16 Mount
18 Tilt axis
20 Height direction
22 Jib
24 Slewing gear
26 Slewing gear brake
30 Dolly
32 Chassis
34 Jib bracket
36 Jib coupling
38 Dolly coupling
40 Ground
44 Dolly coupling sensor
46 Control unit
48 Crane rope
50 Safety bolts
52 Receptacle
$S_D$ Signal

The invention claimed is:

1. A mobile crane, comprising:
one undercarriage;
a superstructure disposed on said undercarriage;
a slewing gear, by means of said slewing gear said superstructure may be rotated relative to said undercarriage;
a slewing gear brake acting on said slewing gear to brake a rotation of said superstructure;
a jib mounted on said superstructure so as to be adjustable at a luffing angle and/or in length;
a dolly coupling disposed on said jib and by means of said dolly coupling said jib is coupled to a mobile crane dolly during dolly travel with said superstructure in an extended position;
a dolly coupling sensor;
a sensor interface connecting to said dolly coupling sensor; and
a controller configured to ascertain, during the dolly travel, whether said jib is resting on the mobile crane dolly, as a function of a signal relating to said dolly coupling sensor, and to activate said slewing gear brake if said jib is not resting on the mobile crane dolly.

2. The mobile crane according to claim 1, wherein said controller is configured to ascertain, as a function of the signal, whether the mobile crane dolly is freely suspended from said jib, or said jib has been detached from the mobile crane dolly.

3. The mobile crane according to claim 1, wherein said controller is configured to activate said slewing gear brake so as to brake to a different extent in dependence on a travel speed and/or cornering speed of the mobile crane.

4. The mobile crane according to claim 1,
further comprising only one drive motor disposed on said undercarriage, both for travel operation and for crane operation;
further comprising a hydraulic line leading to said slewing gear brake;
further comprising at least one hydraulic valve;
wherein said slewing gear brake is configured as a hydraulic brake; and
wherein said controller is adapted to release said hydraulic line in order to activate said slewing gear brake by actuating said at least one hydraulic valve.

5. The mobile crane according to claim 4, wherein said hydraulic line leading to said slewing gear brake is disposed on said superstructure.

6. The mobile crane according to claim 1, further comprising:
a drive motor exclusively for travel operation;
a crane operating motor exclusively for crane operation, wherein said slewing gear brake is supplied with operating energy during crane operation by means of said crane operating motor; and
an energy store for said slewing gear brake when said crane operating motor is switched off.

7. The mobile crane according to claim 1, further comprising a further sensor for detecting a block position of said jib, wherein said controller is configured to additionally take into account whether said jib is in the block position before activating said slewing gear brake.

8. The mobile crane according to claim 1, wherein said dolly coupling sensor is disposed on said jib in a region of said dolly coupling and is connected to said controller via said sensor interface.

9. The mobile crane according to claim 1, wherein said dolly coupling sensor is configured as a contact switch or a proximity switch.

10. The mobile crane according to claim 1, wherein said dolly coupling sensor is a force sensor.

11. A mobile crane system, comprising:
a mobile crane according to claim 1; and
a mobile crane dolly having a chassis, a jib coupling and a jib bracket on which said jib coupling is disposed for connecting to said dolly coupling of said jib of said mobile crane.

* * * * *